(12) United States Patent
Milanowski et al.

(10) Patent No.: US 6,282,360 B1
(45) Date of Patent: Aug. 28, 2001

(54) OPTICAL FIBER ORGANIZER

(75) Inventors: Michel Milanowski, Anserville; Alain Vincent, Juilly, both of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/497,201

(22) Filed: Feb. 3, 2000

(30) Foreign Application Priority Data

Feb. 4, 1999 (FR) .................................................. 99 01294

(51) Int. Cl.⁷ ....................................................... G02B 6/00
(52) U.S. Cl. ............................................................. 385/135
(58) Field of Search ................................... 385/135–147

(56) References Cited

U.S. PATENT DOCUMENTS

| | | | |
|---|---|---|---|
| 4,319,951 | * 3/1982 | Korbelak et al. | 156/502 |
| 4,840,449 | * 6/1989 | Ghandeharizadeh | 385/135 |
| 5,097,529 | * 3/1992 | Cobb et al. | 385/135 |
| 5,396,575 | * 3/1995 | Hayward et al. | 385/135 |
| 5,402,515 | 3/1995 | Vidacovich et al. | |
| 5,661,841 | * 8/1997 | Van Noten et al. | 385/135 |

FOREIGN PATENT DOCUMENTS

| | | |
|---|---|---|
| 0 550 327 A1 | 7/1993 | (EP) . |
| 2 300 488 A | 11/1996 | (GB) . |
| 2 325 531 A | 11/1998 | (GB) . |

* cited by examiner

Primary Examiner—Akm E. Ullah
(74) Attorney, Agent, or Firm—Sughrue, Mion, Zinn, Macpeak & Seas, PLLC

(57) ABSTRACT

The organizer of the invention is of the type having superposable cassettes pivotally mounted in a support housing them, each cassette having a flexible carrier arm for conveying fibers to an inlet passage of the cassette while simultaneously securing the cassette to the support, the arm being suitable for being folded both down against and away from the cassette so as to enable the cassette to pivot relative to the support. Advantageously, a fiber fan-out assembly is mounted on the outside of the support and has outlets staged along a fixing axis for the pivot arms of the various cassettes of the support.

27 Claims, 8 Drawing Sheets

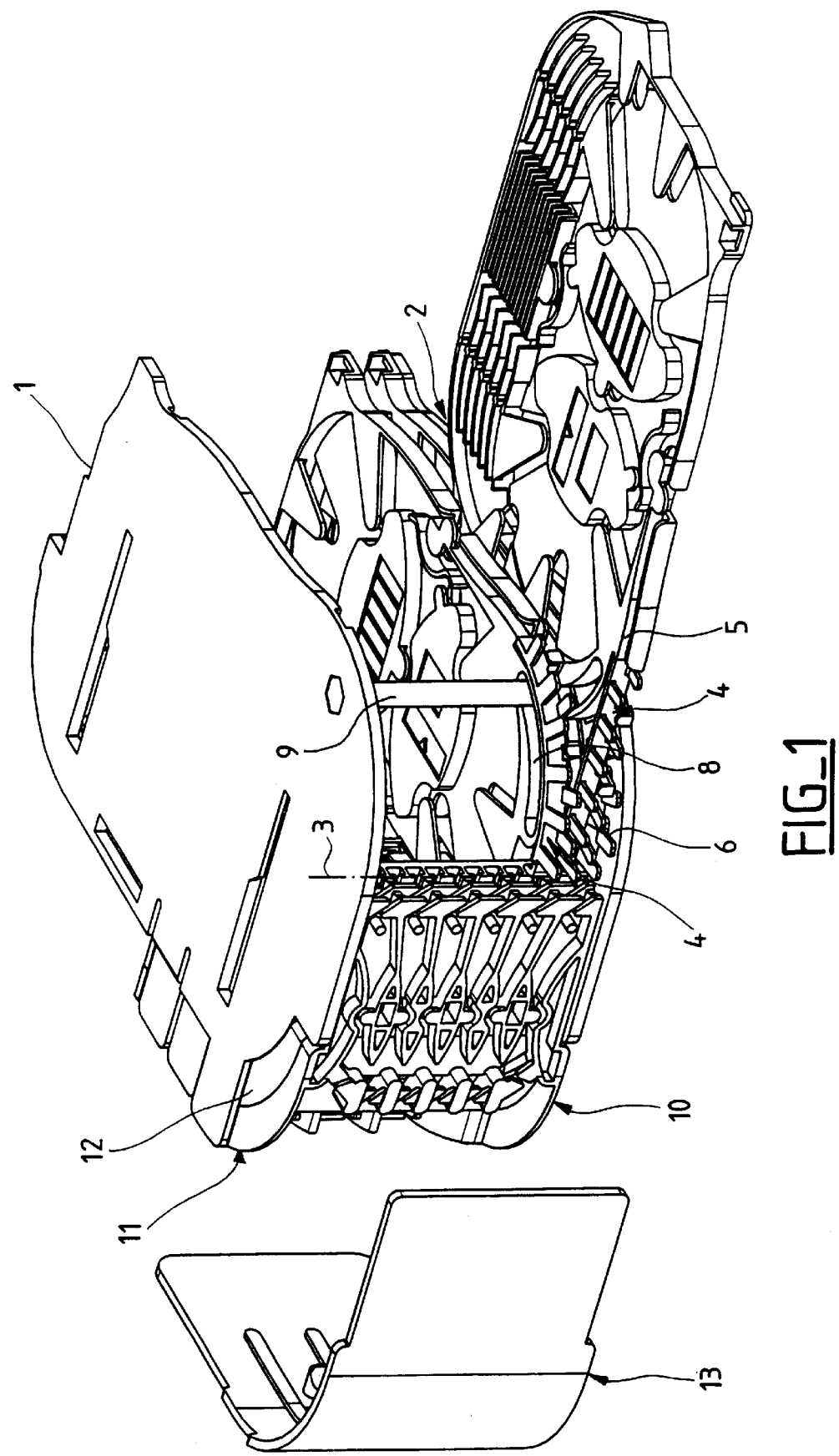
FIG_1

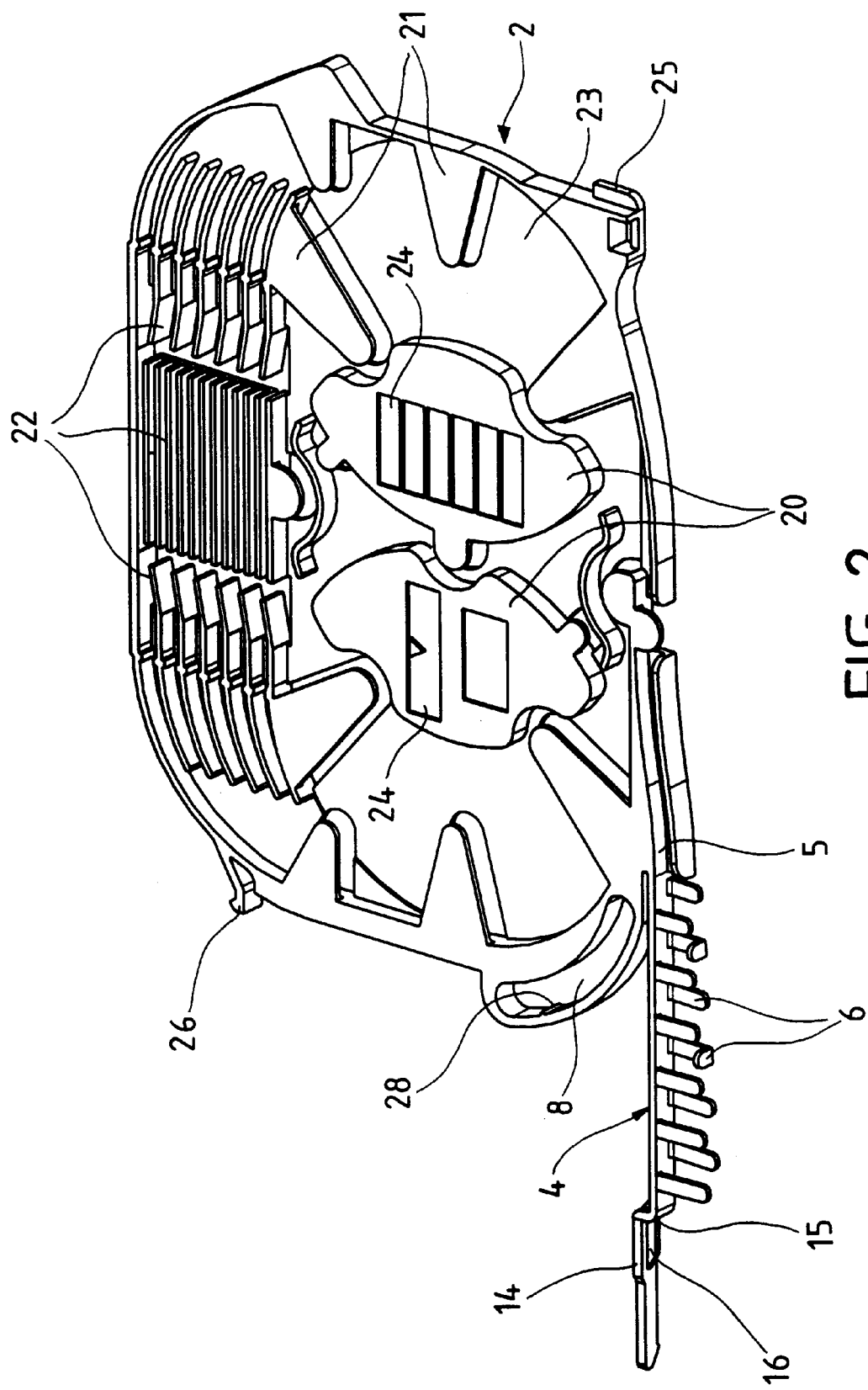
FIG_2

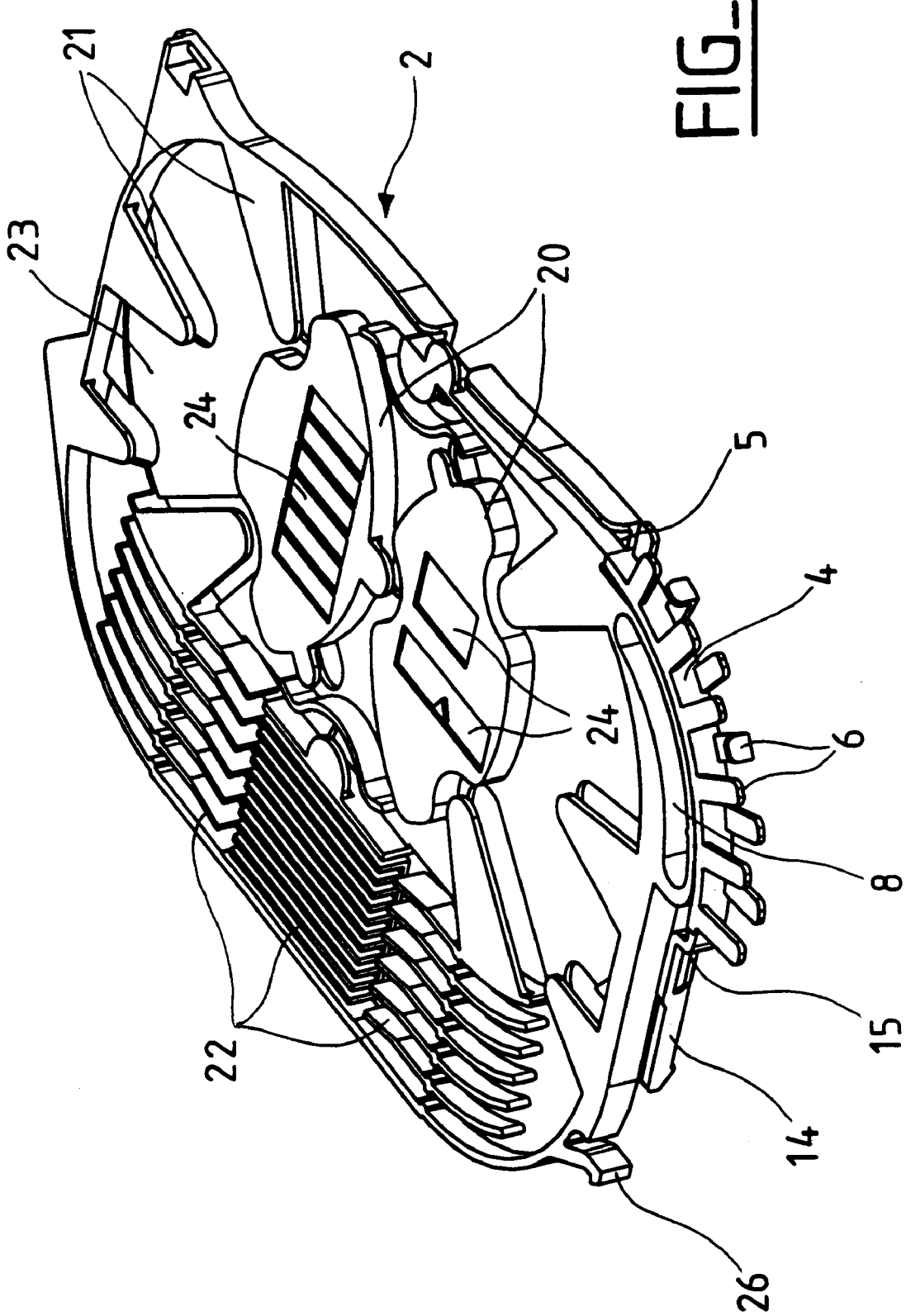
FIG_3

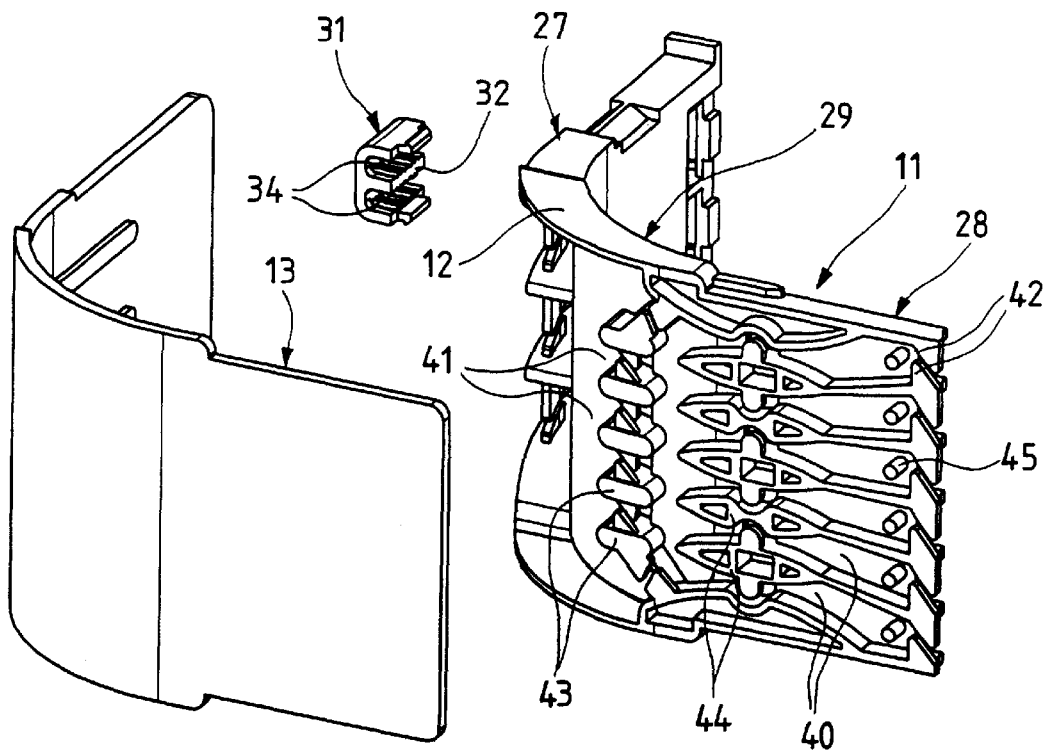
FIG_4
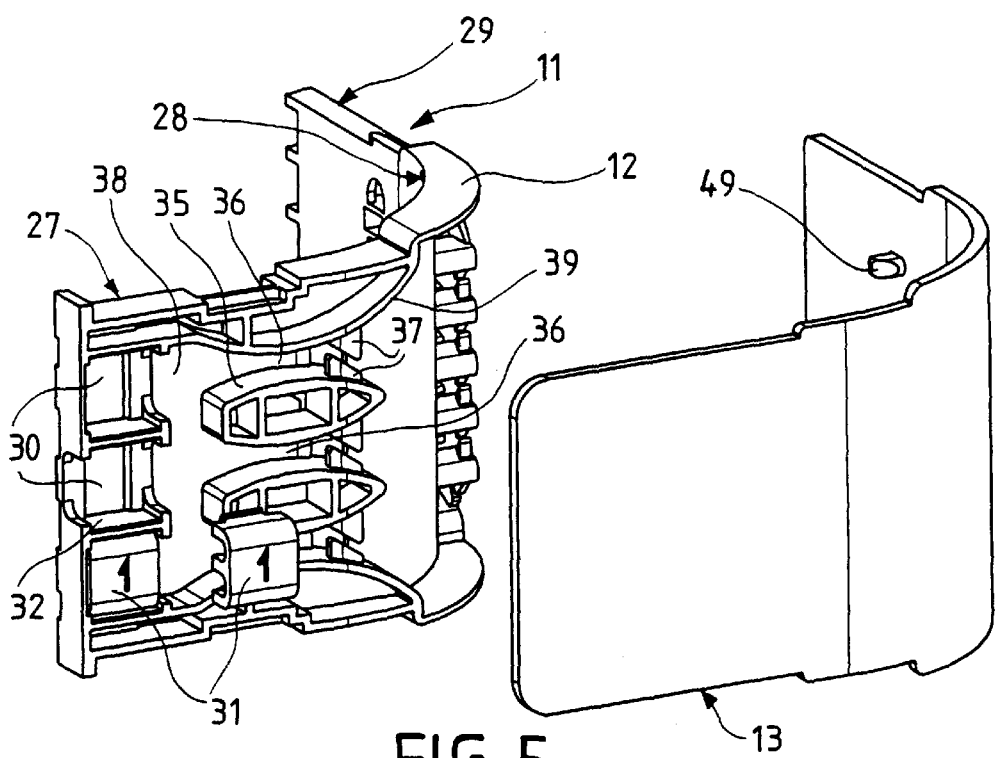
FIG_5

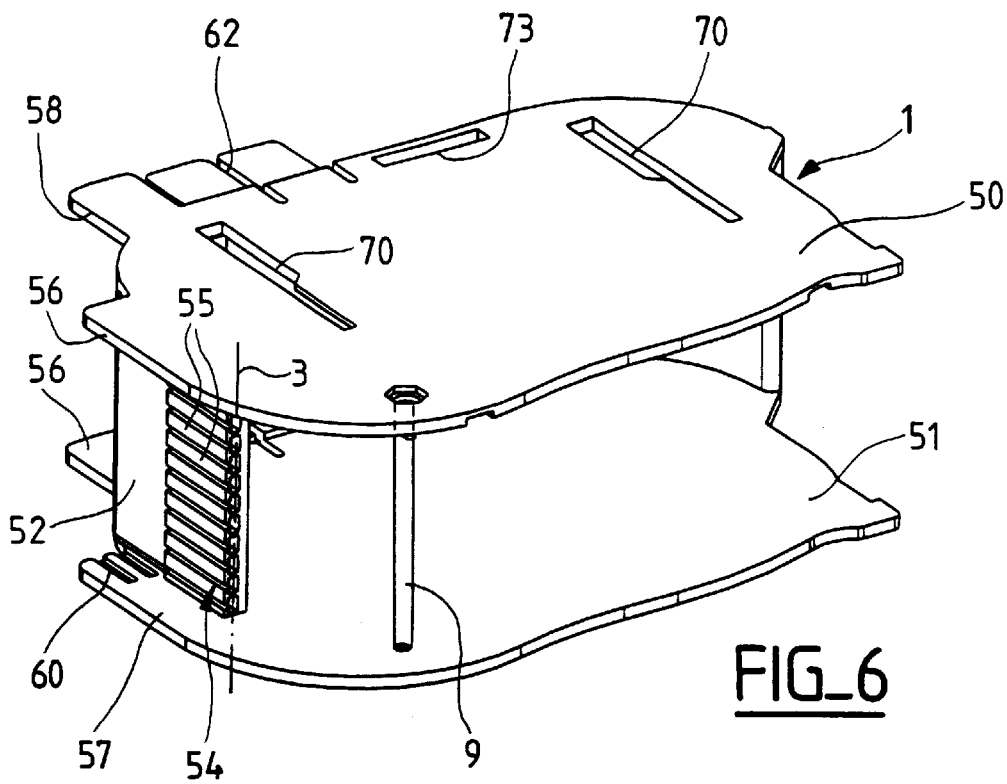
FIG_6
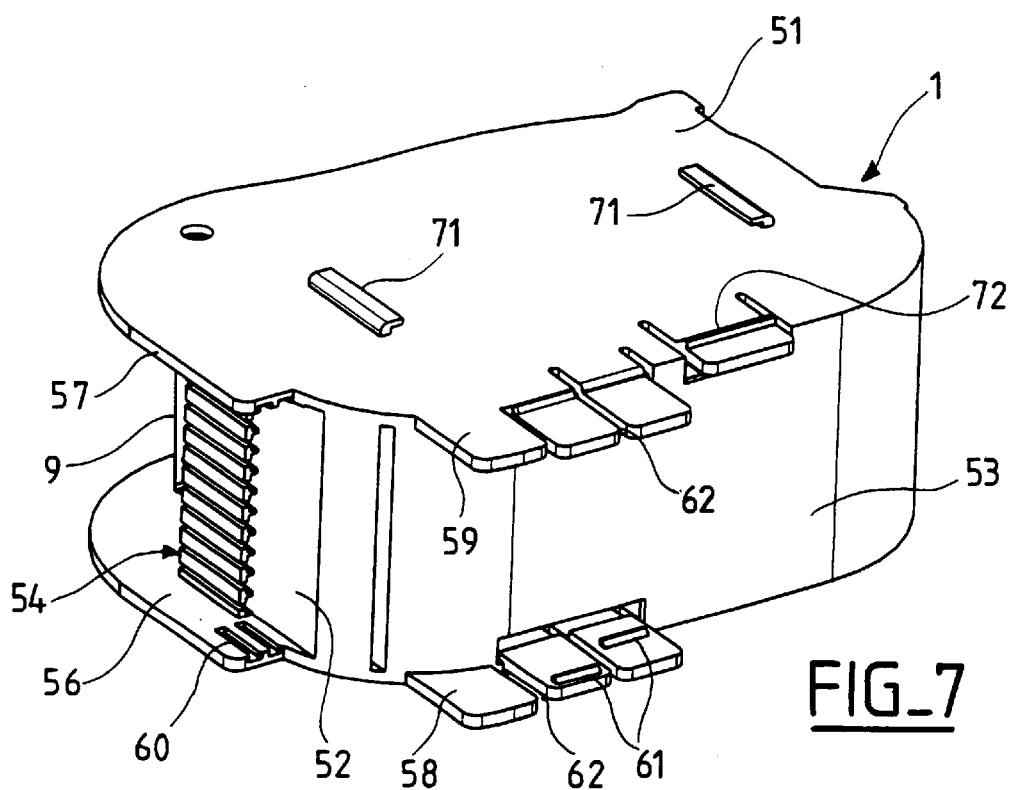
FIG_7

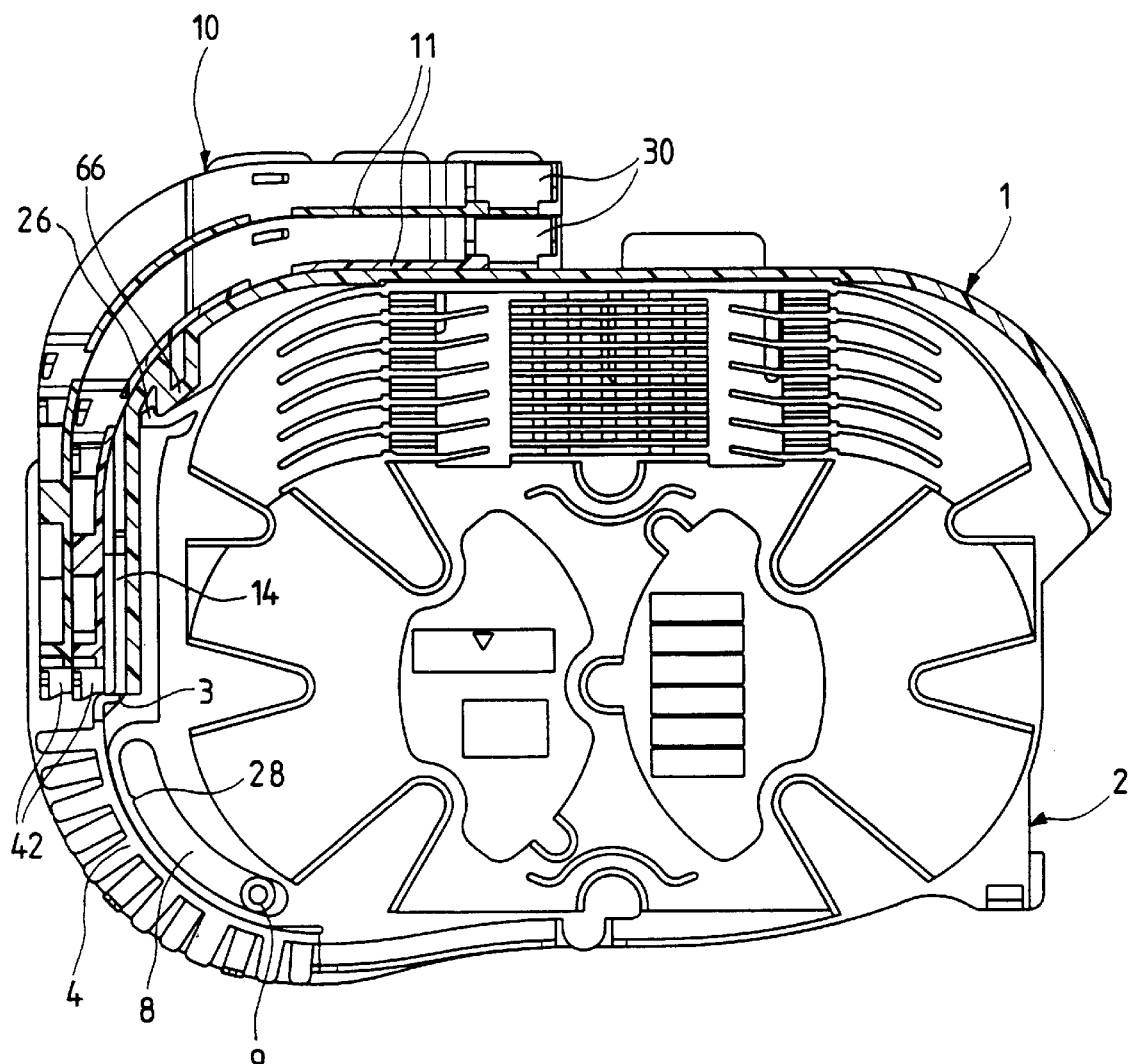
FIG_8

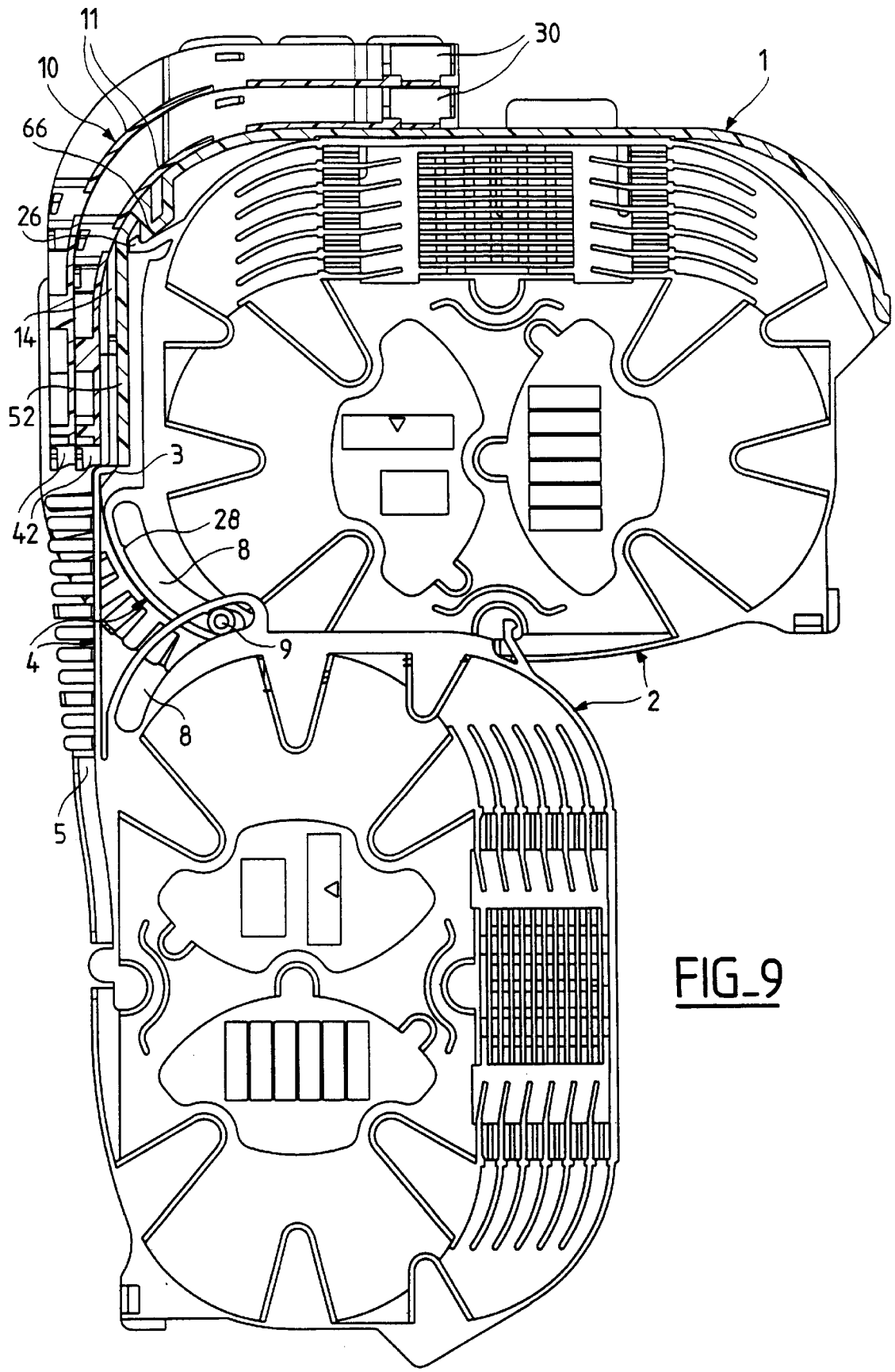
FIG_9

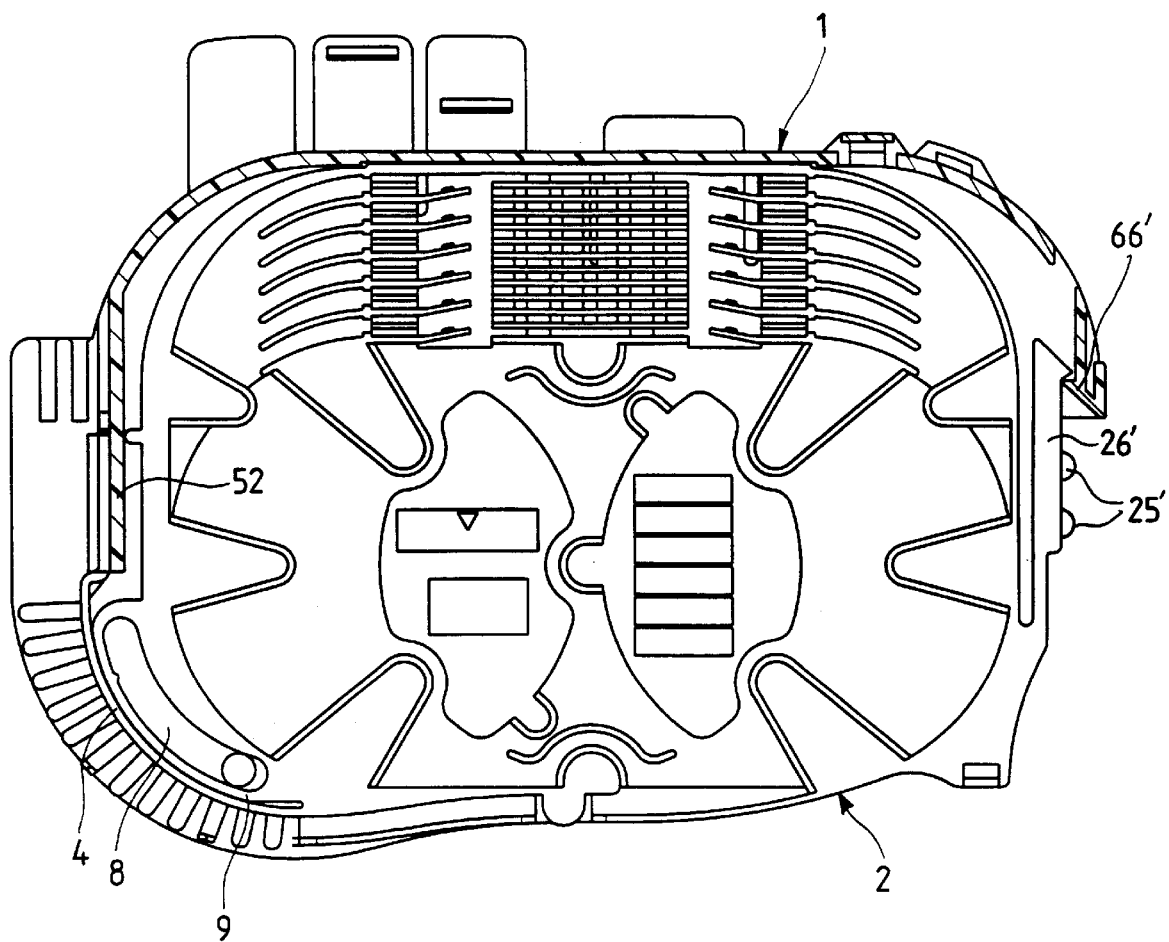
FIG_10

OPTICAL FIBER ORGANIZER

The present invention relates to a system for connecting and/or interconnecting optical fibers of a main cable and of distribution cables. It relates more particularly to a modular assembly for such systems known as an "organizer", which assembly is of the type comprising a housing support and superposable cassettes for stowing fibers and holding splices, which cassettes are received in said support and are individually pivotable therein.

BACKGROUND OF THE INVENTION

Documents U.S. Pat. Nos. 5,402,515 and 5,655,044 disclose organizers of that type, in which each cassette is pivotable about an axis secured to the support and between an open position where part of the cassette lies outside the support and a closed position where the cassette is completely within the support, and in which the cassette pivot axis is located relatively close to a fiber inlet passage in each of the cassettes. A small distance between the pivot axis and the inlet passage serves to limit stresses on the fibers due to the excess length that needs to be managed between the open position and the closed position of each cassette. Nevertheless, that does not suffice to eliminate such stresses in a manner that is completely reliable.

In document U.S. Pat. No. 5,655,044, the support has a rear inside face for guiding fibers to the various desired cassettes of the organizer. Access to the guide face requires all of the cassettes to be put into the open position, which is relatively inconvenient.

OBJECTS AND SUMMARY OF THE INVENTION

An object of the present invention is to avoid putting stresses on the fibers when moving cassettes between the open position and the closed position.

The invention provides an optical fiber organizer comprising:

flat superposable cassettes for stowing fibers and for holding splices, each cassette having a fiber inlet passage;

a support for housing said cassettes, the support having a zone for distributing said fibers towards said cassettes housed therein; and flexible carrier arms each having a fiber retention and protection path, each arm connecting the inlet passage of one of said cassettes to the fiber distribution zone of said support, serving to hold the cassette in a plane, and being foldable down against said cassette and unfoldable away therefrom so as to enable said cassette to pivot in said plane and relative to said support between a closed position and an open position, thereby simultaneously defining a path of constant length for guiding fibers between said fiber distribution zone and said cassette whether placed in either of said open and closed positions.

Advantageously, the organizer presents at least one of the following additional characteristics:

each cassette in said closed position is inside said support and has its inlet passage situated on an open front face of said support and close to a front corner of said cassette, while one of said flexible carrier arms extends the inlet passage of the cassette externally, is foldable against said front corner of said cassette in the closed position, and is provided with an end tab for fixing to a fixing axis on said support;

each of said cassettes has a through guide slot of oblong and arcuate shape, provided along the front corner of the cassette, having a first end contiguous with the inlet passage of the cassette and a second end substantially contiguous with said fixing axis when said cassette is in the closed position, and said support carries a guide pin parallel to the fixing axis and held captive in the guide slots of said cassettes for guiding each of the cassettes while it is pivoting;

said support is in the form of a box that is open at least on said "front" face and at least on part of either side thereof, and includes two first opposite walls that are parallel to said cassettes, one side wall, and a series of fastening means for fastening to said side wall to hold the various flexible carrier arms provided for said cassettes, said fastening means being parallel to said cassettes in said support and defining said fixing axis for said cassettes in a transverse direction;

said organizer has a fiber fan-out assembly mounted externally against at least said side wall and defining said fiber distribution zone on said support and provided with a series of fan-out channels and with "front" outlets staged along said fixing axis;

said fan-out assembly has at least one modular fan-out device comprising at least one rear inlet for docking tubed fibers, the inlet being opposite from the outlets of the fan-out channels and being associated with a docking clip, said docking clip itself preferably being in the form of a comb having a plurality of docking channels, each suitable for receiving and fixing at least one fiber tube in said docking inlet; and said fan-out device has an intermediate portion provided with snap-off rims defining respective additional lateral outlets towards other, analogous organizers.

The fan-out assembly external to the support facilitates implementation. It can be used to manage the fibers of a main incoming cable, to distribute them to the various cassettes or to another organizer, and to manage the fibers of distribution cables as requirements evolve, so as to distribute the fibers to the cassettes and connect them to the fibers of the main cable in the cassettes, by means of splices that are held therein.

The resulting organizer is compact in structure, integrating the functions of fiber fan-out, bare fiber protection without any need to re-tube them, and of connection by means of splices.

BRIEF DESCRIPTION OF THE DRAWINGS

The characteristics and advantages of the invention appear from the following description of an embodiment given by way of example and shown in the accompanying drawings. In the drawings:

FIG. 1 is a partially-exploded perspective view of the organizer of the invention;

FIGS. 2 and 3 are perspective views of a cassette of the FIG. 1 organizer, the cassette being shown in an "open" position and in a "closed" position;

FIGS. 4 and 5 are two perspective views seen from different angles, showing a fan-out device for the above organizer together with a cover associated with the device;

FIGS. 6 and 7 are two perspective views, from in front and behind, of a support for housing said cassettes of said organizer;

FIGS. 8 and 9 are two section views of the FIG. 1 organizer with its cassettes shown in the closed position, and with one of its cassettes shown in the open position while the others remain in the closed position; and FIG. 10 is a section view of a variant embodiment of the organizer showing the organizer partially fitted-out, together with a preferred embodiment of the means for locking and unlocking cassettes in the closed position.

MORE DETAILED DESCRIPTION

With reference to the various figures, and more particularly FIG. 1, it can be seen that the organizer of the invention comprises a support 1 in the form of a partially-open box, together with flat cassettes 2 that are superposed on one another inside said support, with each being fixed to a fixing axis 3 secured to the support. Pivoting enables each cassette to be put into a closed position in which the cassette is completely inside the support, and also into an open position in which the cassette is outside the support, at least in part.

The fixing axis 3 is vertical for cassettes that extend horizontally inside the support which is itself considered as being horizontal. Other dispositions are possible, in particular the fixing axis 3 could be horizontal with the cassettes and the support then being vertical.

For each of the cassettes, the organizer includes a flexible element 4 for conveying fibers to the cassette and simultaneously for securing said cassette to the fixing axis, by defining a flexible cassette-pivoting arm.

This individual element that is provided for each cassette advantageously belongs to the cassette. It extends a fiber inlet passage 5 outwards, which passage is provided on the peripheral edge of the cassette close to a front corner thereof. The arm starts from the end of one of the side edges of the inlet passage and is otherwise independent of the cassette, being fixed to the support 1. It is folded down against the cassette when the cassette is in its closed position and it unfolds when the cassette is moved into its open position. The arm has fins 6 secured to its two longitudinal edges and projecting from a single side thereof for the purpose of retaining the fibers that it conveys to the inlet passage of the cassette. It defines a path of constant length for guiding the fibers, thereby making it possible, while the cassette is pivoting, to avoid, totally or almost totally, putting any stresses on the fibers conveyed thereby. It also serves to protect the fibers it conveys, which fibers are advantageously bare fibers. The fins 6 preferably alternate from one edge to the other of the arm so as to make it easier to insert fibers into the path defined in this way.

Naturally, the flexible arm 4 could be secured to the cassette instead of forming an integral part thereof.

Each cassette 2 has a through guide slot 8 for providing guidance while the cassettes is pivoting, this slot receiving a guide pin 9 secured to the support and extending parallel to the fixing axis. The slot is oblong and arcuate in shape and has two closed ends, one of which is contiguous with the inlet passage 5 of the cassette and the other of which is substantially contiguous with the fixing axis when the cassette is in the closed position. The slot is formed substantially around the arcuate front corner of the cassette against which the arm 4 is folded down. The guide pin 9 is held captive in the guide slots of the various cassettes so that when a cassette is moved between its closed and open position, the pin moves along the slot.

The organizer also has a fiber fan-out assembly 10 mounted outside the support 1 and terminating along the fixing axis. This assembly 10 is shown as being made up of two fan-out devices 11 which are superposed one on the other and which are held on the support 1. Naturally, it could comprise a single device 11 only, providing the single device is sufficient for all of the fibers received by the organizer.

The fan-out assembly enables bare fibers to be distributed in staged manner along the fixing axis 3 so as to be conveyed directly by the flexible arms 4 into the various cassettes of the organizer. It also serves to dock groups of fibers coming from cables, i.e. fibers which are still within a protective sheath or tube, said docking being performed on the rear end portion of the device which is not visible in FIG. 1 but which is described below. It also enables bare fibers to be distributed to other organizers via snap-off side walls 12 provided in each fan-out device 11.

A cover 13 that can be snap-fastened to the fan-out assembly 10 serves to protect the bare fibers therein.

FIGS. 2 and 3 show one of the cassettes, shown respectively in its open position and in its closed position. These figures show the flexible arm 4 with its end tab 14 for fixing to the cassette support. The fixing tab is rectilinear and folds behind the front corner along which the slot 8 is formed. A double bend 15 between the fixing tab and the fiber-conveying portion proper serves as an abutment against the fixing axis, once the fixing tab has been inserted into the cassette support. A small amount of substantially axial extra thickness 16 on the portion of said tab adjacent to the bend 15 serves to hold the fixing tab in place in complementary dispositions provided on the support.

The fins 6 are provided only on that portion of the arm 4 which serves to convey fibers to the inlet passage 5. At least some of the fins have end portions that are bent to be parallel with the arm so as to retain and protect the fibers and so as to define the guide path therefor. It will also be observed that the inlet passage 5 and the guide path defined on the arm 4 are advantageously common to all of the bare fibers received in the cassette.

As shown in the figures, the cassette 2 has stowage means 20 for stowing the fibers it receives, retaining means 21 for retaining the stowed fibers, and means 22 for holding splices between fibers. These various means are relatively conventional per se. Thus, the stowage means 21 in this embodiment are constituted by two drums having semicircular peripheral portions enabling fibers to be coiled in empty gaps such as 23 that are left hollow and that are in communication with one another and with the inlet passage. The stowed fiber retaining means 21 are flat tabs carried by the peripheral edges of the cassette and/or the means 20 and 22 which extend in register with the stowage spaces 23. The splice holding means 22 are constituted by sets of ribs between which the splices are wedged. They are advantageously adapted for splices of various types. They are fixed on the cassette or they can be secured thereto. They are preferably situated in a rear portion of the cassette and become accessible when the cassette is in its open position. Locations such as 24 are defined on the stowage drums 20 for labeling purposes.

The cassette has a laterally-extending projecting finger at the front corner remote from the slot 8 and the arm 4. The thickness of the finger 25 is less than that of the cassette so as to enable a cassette to be selected and taken hold of when the cassettes are superposed. It enables a desired cassette from a stack of superposed cassettes to be actuated so as to bring the cassette into its open position.

A resilient rear tab 26 is provided for snap-fastening purposes substantially on the rear corner which is diametrically opposite the finger 25 of the cassette so as to enable the cassette to be locked in its closed position inside the support. A small projection 28 on at least one of the edges of the rear end portion of the slot 8 enables the cassette to be locked in its open position.

The cassette and the various dispositions provided thereof, together with its flexible arm 4 are all made out of plastics material by molding.

FIGS. 4 and 5 show that the fan-out device 11 is elongate and arcuate in shape, matching the outline of the walls and the corner of the support which receives it, and that its protective cover 13 is of analogous shape.

The fan-out device 11 is relatively flat and rigid, and is preferably made of molded plastics material. Its inner concave face is smooth. Its outer convex face has various series of ribs of shapes adapted to their functions, and one embodiment thereof is described with reference to FIGS. 4 and 5.

A rear portion 27 is organized to receive and dock the fibers of a main incoming cable and/or of distribution cables and to perform an optional first fan-out of said fibers. The fibers of the above-mentioned cables are contained in protective tubes or sheaths and are thus docked and left bare immediately after docking. An opposite front portion 28 is organized to perform fan-out proper of the bare fibers to the various cassettes. An intermediate portion 29 provides coupling between the rear and front portions 27 and 28 and also provides for additional lateral outlet through one and/or the other of the sides to other identical organizers.

The end portion of the rear portion 27 has inlets 30 and complementary docking clips 31 associated with each inlet. Each inlet is defined between two straight and relatively short ribs 32 and is relatively wide. The clip 31 is subdivided internally by one or more teeth 33 so as to constitute a comb having a plurality of parallel docking channels 34. Each of these channels is suitable for receiving and retaining one or two fiber-containing tubes, in which case the tubes are held superposed in the channel. In the example shown, the comb has two channels so as to be capable of receiving two large "inlet" fiber tubes. In a variant it may have three channels so as to have a total capacity of six small tubes which are held in superposed pairs in respective channels. The teeth are ribbed to provide good retention of the tubes. The clip is snap-fastenable in the inlet so as to be held therein while still being removable therefrom.

In a variant, only one inlet 30 is provided, centered halfway up the rear end portion. Naturally, each inlet in said end portion can be subdivided and its docking clip need not be internally subdivided.

A first series of relatively long broad and hollow ribs 35 defines a small number of guide channels 36 for initial guidance and/or fan-out of the now bare fibers received from the end of the inlet. Fins 37 carried by these ribs serve to retain the fibers in these channels. A small offset gap between the facing fins, or in a variant a disposition of the fins so that they do not face each other in pairs in the channels, makes it easy to insert fibers in the channels. The fibers are left bare in an empty space 38 provided between the inlet 30 and said channels 36.

In this embodiment, three channels 36 staged over the full height of the rear end portion 27 are provided to correspond with three inlets 30, however they could equally well correspond with a single inlet 30.

The front portion 28 for fan-out proper is subdivided into narrower fan-out channels 40 distributed over its height, these channels having guide inlets 41 and subdivided outlets 42. The guide inlets are defined by relatively short ribs 43. The fan-out channels are defined by ribs 44 that are relatively long, narrow, and that swell to some greater or lesser extent. The outlets 42 are defined by pegs 45 in the front end portions of the channels. Fins (no reference) are provided on the ribs to make it possible to insert and hold fibers in the guide inlets, in the fan-out channels, and in the subdivided outlets. Advantageously, these outlets 42 are provided in the same number and at the same pitch as there are possible positions for cassettes in the support, and at the same levels as those cassettes.

In the embodiment shown, the fan-out device has six fan-out channels 40 and one peg 45 per channel, thereby defining twelve staged outlets 42 for twelve possible cassettes in the support.

The intermediate portion 29 is smooth and arcuate so as to correspond to the rear corner of the support. The above-mentioned snap-off walls 12 for defining outlets to other organizers are rims that can easily be snapped off said intermediate portion. In this respect, it should be observed that the side ribs, particularly in the front portion, terminate at these snap-off walls by forming an arcuate transition 39 for guiding the fibers towards the side outlets when the walls 12 have indeed been snapped off.

Means are provided on the fan-out device for guidance and for holding in place on the support, which means are in the form of lateral guide tabs on the edges of its front portion, keying and abutment shoulders such as 47 on the edges of its rear portion and between the edges of its various portions, and rear end abutments 48.

The cover 13 has the form of a simple arcuate plate, preferably made out of plastics material, with positioning and retaining fingers such as 49 on its concave inner face. These fingers are received and held between ribs and/or in holes of appropriate shape in some of the hollow ribs of the fan-out device when protected in this way.

FIGS. 6 and 7 show the support 1, with references 50 and 51 designating the opposite walls thereof that extend parallel to the cassettes and that are referred as the top and bottom walls respectively, reference 52 designating its side wall defining the fixing axis 3 along its front end, and reference 53 designating its rear wall. The support is open via its front face and on either side thereof, at least in part.

FIGS. 6 and 7 show that the side wall 52 carries a series of fastening means 54 for securing the cassette arms so as to fix the arms while allowing the cassettes to pivot in the support. These means are constituted by a series of parallel grooves extending from the front end of the wall towards the rear, and they are at the same pitch as the superposed cassettes. These grooves are defined between T-section ribs 55. The ribs are provided on the outer face of the wall and over a portion of the length thereof.

The fixing axis 3 is defined at the inlets to these fastening grooves 54.

The guide pin 9 is a cylindrical rod mounted between the top and bottom walls and secured thereto. It is situated in front of the axis 3.

Each of the walls 50 and 51 has a rounded corner extending substantially between the axis 3 and the pin 9, each corner projecting from the side wall 52, thereby defining two side projections 56 and 57 which extend continuously with the front rounded corner of each of them. They also have rear projections 58 and 59 projecting beyond the rear wall 53, at least along the end portion thereof situated beside the side wall 52. These projections 56 to 59 are interrupted over the length of the rear corner defined between the side wall 52 and the rear wall 53. They serve to guide and hold in place the fan-out device(s). For this purpose, they are fitted with guide means such as grooves 60 in the rearmost portions of the side projections and ribs 61 on at least one of the rear projections.

The rear projections are advantageously subdivided into adjacent blades by slots 62 in each of them so as to impart a small amount of flexibility thereto and define abutments for positioning and holding each fan-out device between said blades.

The support 1 also has complementary slideways 70 and 71 on its walls 50 and 51 so as to make it possible for a plurality of organizers to be superposed. These slideways are ribs extending parallel to one of the walls and slots or grooves on the other wall, and passing through the wall towards the front face of the support. An additional rear rib 72 and an additional rear groove 73 are provided on the same walls 50 and 51 and extend parallel to the front face so as to define a locking position for two superposed supports or organizers.

FIGS. 8 and 9 serve to complete the description of the organizer and to show its advantages.

They show the open and closed positions that can be taken up by each of the cassettes 2 in the support 1, together with the means for locking each cassette in either of these two positions. A cassette is locked in the closed position by the rear tab 26 of the cassette snap-fastening on an inside edge 66 provided at the rear corner between the side wall 52 and the rear wall 53 of the support. Locking in the open position is provided by a projection 28 provided on the rear end portion of the slot 8 and by the guide pin 9 situated behind said projection which then acts as an abutment for holding the pin in the rear portion of the slot 8.

These figures show clearly how each cassette 2 is secured to the support 1 by means of the arm 4 for the purpose of pivoting the cassette by deploying the flexible arm which is fixed to the front end of the side wall 52, and for simultaneously guiding fibers between the fan-out assembly 10 and the inlet passage 5 of the cassette, by defining a path for the fibers that is of constant length regardless of the position of the cassette. This constant length path avoids any need for fibers to be provided with slack to enable the cassette to pivot. As a result the fibers are not subjected to any kind of stress when any of the cassettes in the organizer is handled.

The figures also show that the organizer is advantageously fitted with two fiber fan-out devices 11 which are superposed one on the other and whose respective outlets are in register with arms 4 belonging to different cassettes within the support 1. These two superposed fan-out stages having an individual outlet per cassette enable the fibers of a main inlet cable to be managed separately from the fibers of distribution cables. This makes it possible to provide initial or "fixed" fan-out for the fibers of the inlet cable to various different cassettes by using the inner of the two fan-out devices, and also makes it possible to provide later fan-out to keep up with requirements for distribution fiber cables by using the outer of the two fan-out devices. These two fan-out devices are substantially identical so as to enable them to be superposed.

It should also be observed that in the presence of a large-capacity fiber tube coming from a main inlet cable and docked in one of the inlets 30 or in the sole inlet 30 of the inner fan-out device, it is possible to cause some of the fibers to exit and be guided laterally into the corresponding fan-out device of another organizer.

First distribution of fibers in a fan-out device can take place outside the cassette support 1 because that is easier. After the cassette has been put into place on the support, the fibers of additional distribution cables can continue to be distributed until the organizer is full.

Advantageously, the organizer is designed to manage inlet cable fibers and then to manage distribution cable fibers as and when required. In particular, the independent cassettes make it possible to connect fibers of the inlet cable to distribution cable fibers via splices that are held in the cassettes, and also makes it possible to stow inlet cable fibers that are waiting to be spliced and that can optionally already have been cut to length.

When stowed fibers have not been cut to length, they leave the corresponding cassettes via the inlet passage and then via the guide arm of each cassette. They are then received and guided in the fan-out channels to the docking inlet. Under these conditions, the docking clip is in the form of a two-channel comb, one for retaining incoming fibers and the other for retaining stowed outgoing fibers that have not been cut to length. These incoming and outgoing fibers are contained in the initial cut tube and are thus retained in the two channels of the comb.

The present invention as described with reference to the embodiment shown in FIGS. 1 to 9 can naturally be adapted without going beyond the ambit of the invention by replacing various means used in the embodiment described by other means that are functionally equivalent.

Thus, FIG. 10 which is comparable to FIG. 9 shows an organizer without its fiber fan-out assembly but in which the locking and unlocking means associated with holding each cassette in the closed position have been adapted. As in FIG. 8, these means are constituted by a resilient snap-fastening tab 26' provided on the cassette 2 and by an inwardly projecting edge 66' provided on the support 1. However they are in a different position so as to make them easier to unlock.

The tab 26' is of elongate shape, is secured at one of its ends to the other front corner of the cassette remote from the slot 8, and extends freely along the side edge of the cassette towards the rear thereof, leaving clearance between itself and the cassette proper. Its portion for coupling to the cassette is of small thickness so as to be easily flexible.

The edge 66' for retaining the tab 26' is at the end of the other side face of the support 1, remote from the face 52, is truncated to a large extent, and forms the other rear corner of the support. This other rear corner is reinforced by ribs to provide mechanical strength.

Outwardly-projecting fingers 25' on the tab 26' make it easy to select an actuate the cassette by means of its tab 26' for the purpose of releasing said tab from the retaining edge 66' merely by applying pressure on the cassette, all more particularly on its snap-fastening tab 26'.

What is claimed is:

1. An optical fiber organizer comprising:

flat superposable cassettes for stowing fibers and for holding splices, each cassette having a fiber inlet passage;

a support for housing said cassettes, the support having a zone for distributing said fibers towards said cassettes housed therein; and flexible carrier arms each having a fiber retention and protection path, each arm connecting the inlet passage of one of said cassettes to the fiber distribution zone of said support, serving to hold the cassette in a plane, and being foldable down against said cassette and unfoldable away therefrom so as to enable said cassette to pivot in said plane and relative to said support between a closed position and an open position, thereby simultaneously defining a path of constant length for guiding fibers between said fiber distribution zone and said cassette whether placed in either of said open and closed positions.

2. An organizer according to claim 1, wherein, in said closed position, each cassette is inside said support and presents its inlet passage on an open front face of said support close to a front corner of said cassette, and in said open position each cassette is outside said support, at least in part, and wherein said arm extends said inlet passage of the cassette outwards away from said front corner thereof and is foldable down against said front corner of said cassette in the closed position and is provided with an end fixing tab for fixing to a fixing axis formed on said support at one end of said distribution zone on said support.

3. An organizer according to claim 2, wherein said arm is secured to a side edge of the inlet passage of the cassette and has a series of fins secured to its own edges and projecting on the same side thereof so as to define said fiber retention and protection path that opens out into said inlet passage of the cassette.

4. An organizer according to claim 2, wherein each of said cassettes has a through guide slot of oblong and arcuate shape, provided along said front corner of the cassette, having a first end adjacent to the inlet passage of the cassette and a second end substantially adjacent to said fixing axis when said cassette is in the closed position, and wherein said support carries a guide pin parallel to the fixing axis and held captive in the guide slots of said cassettes to guide each of the cassettes during pivoting thereof.

5. An organizer according to claim 2, wherein said support is in the form of a box that is open at least via said front face and at least in part on either side thereof, and having two opposite first walls that are parallel to said cassettes, a side wall, and a series of fastening means on said side wall to hold the various arms provided for said cassette, said fastening means being parallel to said cassettes in said support and defining transversely said fixing axis of said cassettes.

6. An organizer according to claim 5, wherein said series of fastening means is constituted by a series of grooves whose ends situated adjacent to the front face of the support and referred to as "front" end together define said fixing axis.

7. An organizer according to claim 6, wherein said grooves are defined between T-section ribs.

8. An organizer according to claim 7, wherein said ribs are situated on the outside face of said side wall.

9. An organizer according to claim 5, including a fiber fan-out assembly mounted on the outside against at least said side wall, thereby defining said fiber distribution zone, and provided with a series of fan-out channels and of "ffront" outlets staged along said fixing axis.

10. An organizer according to claim 9, wherein said fan-out assembly comprises at least one modular fan-out device.

11. An organizer according to claim 10, wherein said fan-out device comprises at least one rear inlet for docking fibers in a protective tube, said inlet being situated at a rear end remote from the outlets of said fan-out channels, and a docking clip associated with and complementary to each rear docking inlet.

12. An organizer according to claim 11, wherein said docking clip is in the form of a comb having a plurality of docking channels, each suitable for receiving and fixing at least one tube containing fibers.

13. An organizer according to claim 11, including a series of guide channels defined by first ribs and situated after each docking inlet on the corresponding rear end proton of the fan-out device so as to receive bare fibers and also optionally perform initial fanning-out thereof.

14. An organizer according to claim 13, wherein said fan-out channels extend over a front end portion of said device, said front and rear end portions being separated by a smooth intermediate coupling portion.

15. An organizer according to claim 14, wherein said intermediate portion is provided with snap-off side rims each defining an additional side outlet to at least one other, analogous organizer.

16. An organizer according to claim 10, wherein said fan-out channels are defined by at least one second series of ribs and said front outlets are defined by at least one peg subdividing said fan-out channels.

17. An organizer according to claim 16, wherein said front outlets are at the same pitch as said cassettes in said support.

18. An organizer according to claim 10, including a cover suitable for being snap-fastened on said fan-out assembly.

19. An organizer according to clam 18, wherein said fan-out assembly is constituted by two fan-out devices superposed one on the other.

20. An organizer according to claim 19, wherein each fan-out device is arcuate in shape and extends along said side wall, along a portion of a "rear" wall of said support, and along a rear corner of arcuate shape between said side wall and said rear wall.

21. An organizer according to claim 10, wherein said support has means for holding said fan-out assembly, said means comprising opposite projections defined by said first opposite walls of said support and projecting outwardly from at least said side wall thereof, with said fan-out assembly being received and held therebetween.

22. An organizer according to claim 4, wherein said support and said cassettes are fitted with complementary locking means for locking each cassette in at least one of its open and closed positions, said locking means comprising firstly said guide pin carried by said support and secondly a projection projecting into at least one of the end portions of said guide slot of the cassette.

23. An organizer according to claim 5, wherein said support has an inwardly-projecting edge and each cassette has a snap-fastening resilient tab provided in correspondence with said edge for locking the cassette in its closed position in said support.

24. An organizer according to claim 23, wherein each of said cassettes has a selection finger enabling said cassette to be taken hold of when in its closed position in said support, said finger projecting from an accessible peripheral portion of the cassette when it is in its closed position in said support, so as to enable said cassette to be moved from its closed position to its open position.

25. An organizer according to claim 23, wherein said edge is parallel to and substantially opposite from said fixing axis and is formed by another truncated side face of said support, and wherein said resilient tab is secured via one of its ends to another front corner of the cassette and extends laterally along the cassette, leaving clearance between itself and said cassette.

26. An organizer according to claim 25, wherein said resilient tab has at least one outwardly-projecting finger for selecting the cassette and for actuating said resilient tab so as to press it against the cassette to disengage said resilient tab from said edge.

27. An organizer according to claim 5, wherein said support has complementary slideways on said first opposite walls to enable such organizers to be mounted one on another.

* * * * *